May 7, 1968     D. G. HANN ETAL     3,382,310

GLASS FEEDING FURNACES

Filed April 27, 1966     2 Sheets-Sheet 1

INVENTORS:
DOUGLAS GRAEME HANN
RICHARD JOHN BRINKMAN
BY Kurt Kelman
AGENT

May 7, 1968  D. G. HANN ETAL  3,382,310
GLASS FEEDING FURNACES
Filed April 27, 1966  2 Sheets-Sheet 2
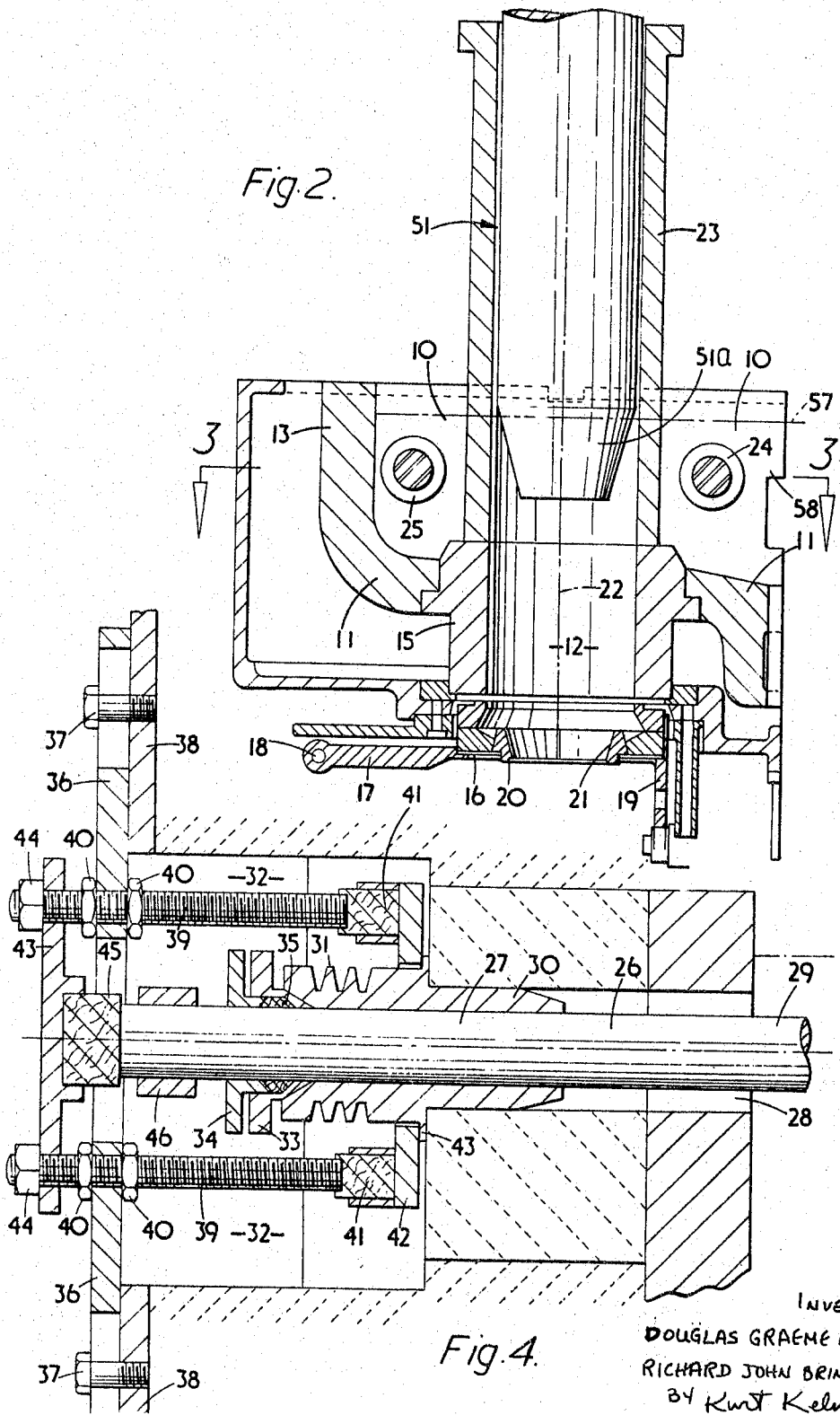
INVENTORS:
DOUGLAS GRAEME HANN
RICHARD JOHN BRINKMAN
BY Kurt Kelman
AGENT 3,382,310
GLASS FEEDING FURNACES
Douglas Graeme Hann, Ryton, near Shifnal, and Richard J. Brinkman, Kilsall Hall, near Shifnal, England, assignors to Elemelt Limited, Bilston, England, a British company
Filed Apr. 27, 1966, Ser. No. 545,768
Claims priority, application Great Britain, Apr. 29, 1965, 17,987/65
7 Claims. (Cl. 13—6)

This invention relates to a glass feeding furnace.

The expression "glass" as used herein is to be deemed to include vitreous materials generally. The expression "glass feeding furnace" as used herein is to be deemed to include any chamber in which a quantity of molten glass is contained and from which such glass is delivered either in discrete pieces termed "gobs" or in a continuous stream.

It is important in many glass articles and in the performance of the methods by which they are produced that so far as possible the glass gob or glass stream in which the article in question is shaped or made is initially, that is to say at the instance of delivery from the glass feeding furnace, homogeneous as to the temperature of its different parts.

A construction which meets this requirement is disclosed and claimed in United States Letters Patent No. 3,080,737 issued to Philip Anthony Maunsell Gell and Douglas Graeme Hann. This patent discloses and claims a glass feeding furnace wherein electrode means are provided at an outlet and at a position spaced longitudinally therefrom in an annular zone surrounding a reference axis passing through the outlet for passing an alternating current through the intervening body of molten glass, the electrode means in the annular zone occupying a sufficient proportion of the length thereof to provide for control of current density around the reference axis and being adjustable in position and/or having a supply circuit which includes voltage adjustment to enable the current density in one segment of the current path to be varied relatively to that in another angularly spaced segment thereof.

In a specific form of the electrode means which are spaced longitudinally from the outlet we have described and claimed upper electrodes which are of part annular plate-like form disposed in planes generally perpendicular to the reference axis.

As disclosed in the specification these electrodes include supporting stems projecting downwardly through openings in the top wall of the feeding furnace. The plate-like electrodes and the lower part of each supporting stem is immersed in the molten body of glass when the latter is at its normal level and the upper part of each stem is surrounded by gaseous constituents (predominantly air) contained in the feeding furnace in the space between the top wall and the surface of the molten glass.

If the gaseous constituents are of an oxidising character, as will be the case if they consist predominantly of air, there is a tendency for the supporting stem of each of the upper electrodes to become oxidised thus reducing its service life.

Introduction of a gaseous constituent or constituents forming a reducing atmosphere in the space concerned can have disadvantageous effects upon the chemical composition of the molten body of glass contained in the feeder furnace.

The present invention is concerned with the provision of a modification or improvement intended to overcome or reduce these difficulties.

The improvement according to the present invention is applicable to a glass feeding furnace comprising a feeding chamber having a side wall formed with a lateral entry for inflow of glass into said chamber to maintain the surface of such glass in said chamber above a minimum level and a bottom wall having an outlet for downward delivery of a body of glass from said chamber, such improvement comprising the combination of lower electrode means disposed in the vicinity of said outlet and extending around a reference axis passing upwardly through said outlet, upper electrode means including a plurality of electrodes disposed in positions spaced apart angularly about said reference axis and spaced axially thereof from said lower electrode means each of said electrodes including a portion disposed in said chamber below said minimum level and a portion extending through one of said chamber walls, a source of electrical current, circuit means connecting said source to said upper electrodes and said lower electrode means to pass current through the glass contained in said chamber in a plurality of paths extending from said lower electrode means to said upper electrodes respectively, and means for varying the current density in one of said paths relatively to that in another of said paths.

A further object of the invention is to provide for positional adjustment of each of the upper electrodes relatively to the feeding chamber to enable the extent to which such electrodes project into the chamber to be controlled to compensate for any consumption of electrode material leading to shortening of said portion in the feeding chamber, and possibly, in certain circumstances, to effect positional adjustment of the current path along which current flows from the upper electrode concerned to the lower electrode means.

With this object in view a further feature of the invention is that each of the upper electrodes preferably comprises an electrode body in the form of a stem having a portion disposed in said feeding chamber and a portion extending through the side wall thereof, a sleeve-like member embracing the last said portion of said stem, said sleeve-like member presenting a heat dissipating surface externally of said feeding chamber, and means for controlling the relative positions of said stem and said sleeve in a direction longitudinally of said stem and operable externally of said chamber.

The invention will now be described by way of example with reference to the accompanying drawings wherein:

FIGURE 2 is a view in side elevation and in cross section on the line 2—2 of FIGURE 3 of the lower part of the feeding chamber, upper and lower electrode means, plunger and stirrer.

FIGURE 4 is a fragmentary view in end elevation and in cross section on the line 4—4 of FIGURE 2.

Figure 1:
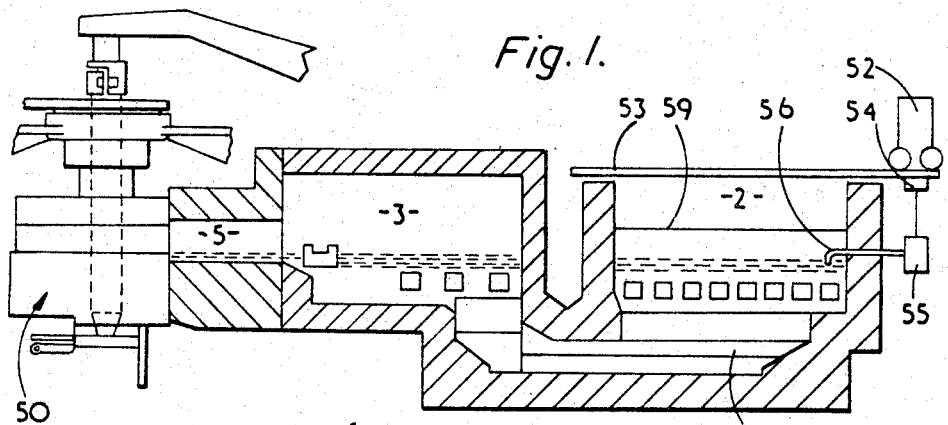
FIGURE 1 is a view in side elevation and partly in vertical cross section showing a complete furnace assembly to which a glass feeding furnace incorporating the invention may be applied.

The complete furnace assembly shown in FIGURE 1 is constructed and adapted to operate substantially as described and claimed in the previously mentioned United States Letters Patent 3,080,737. For convenience it is herein stated that such furnace assembly comprises four main portions, these being a furnace chamber 2 in which glass batch materials of solid or divided form are melted and partly refined, a further chamber 3 connected therewith by way of a duct 4 and in which further refining takes place, and a forehearth 5 serving to connect the further chamber with the chamber of the feeding furnace now described.

The level of liquid glass maintained during operation of the furnace assembly in the forehearth and the chamber of the feeding furnace hereinafter described is determined by the "hydraulic pressure" of glass flowing through the furnace assembly from the furnace chamber 2 in which initial melting takes place to the feeding chamber. Such "hydraulic pressure" is in turn determined by the rate at which solid state constituents of the glass batch, herein called batch materials, are fed into the furnace chamber relatively to the through-put, that is to say the rate at which glass flows out of the outlet of the feeding chamber hereinafter described.

A batch charging carriage 52 movable on rails 53 fom a loading position offset laterally from the chamber 2 to an operative position over the chamber by means of a motor 54 delivers glass batch materials to lie as a crust or blanket, as indicated at 51, on the surface of the liquid glass. A sensing means such as a probe 56 provides a signal in response to whether such probe is contacted by the liquid glass level or whether the latter is spaced below the probe, and such signal is fed to a control circuit 55 furnishing an output to cause the motor to operate and effect a traverse of the carriage over the furnace chamber to maintain the liquid level of glass therein approximately constant. It will be understood that this system is representative of a number of charging systems which may be employed, for example if the chamber 2 is enclosed by a roof member charging may be effected through an opening at one end of the furnace chamber either manually or by an archimedean screw type of conveyor. The level of the glass may be detected automatically by a probe, as shown, or an operator may have a sighting aperture or tube to view this level and effect charging manually or by the screw conveyor as required to maintain the level approximately constant.

Figure 3:
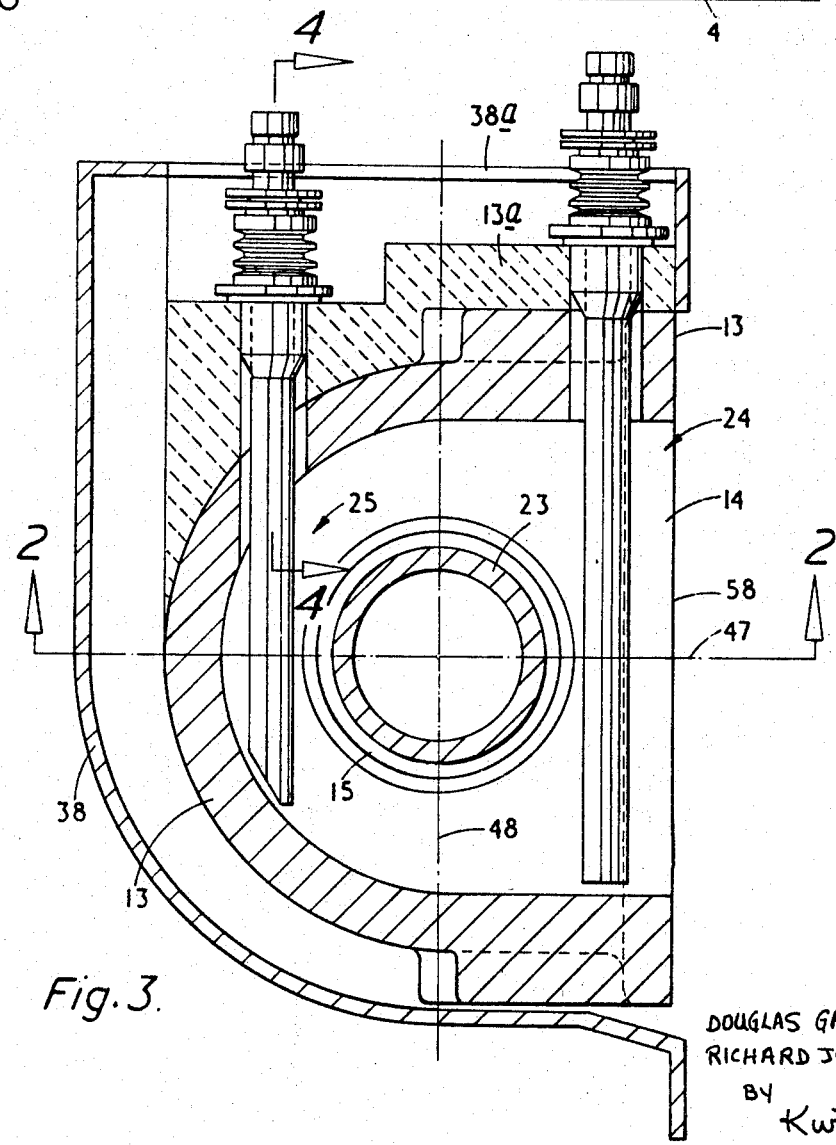
FIGURE 3 is a plan view of the parts shown in FIGURE 2 in cross section on the line 3—3 of FIGURE 4.

The feeding furnace indicated generally at 50 comprises a feeding chamber 10 having a bottom wall 11 formed with an oulet 12. The bottom wall is integrally connected with the lateral wall 13 which may be of generally semi-cylindrical form as seen particularly in FIGURE 3 open at one side as indicated at 14 to provide an inflow path for molten glass from the forehearth.

The outlet 12 is surrounded by a bushing 15 of refractory non-metallic material below which is disposed an electrode 16 herein called the lower electrode, this being in the form of a metal ring and supported in any suitable manner, for example by a plate 17 hinged about a horizontal axis 18 at one side and normally retained in a position shown by a fastening member 19. The lower electrode 16 is fitted with a bush 20 of non-metallic refractory material which is an electrical insulator and which presents a frusto-conical seating 21. As shown in FIGURES 1 and 2 the feeding furnace includes a vertically reciprocating plunger 51 arranged coaxially with the reference axis 22 formed at its lower end with a downwardly tapering end portion 51a for co-operation with the seating 21.

Reciprocation of the plunger 51 causes gobs of glass to be fed from the outlet.

Surrounding the plunger 51 the furnace may include, as shown, a sleeve 23 of refractory non-metallic material which can be oscillated and also raised and lowered.

The upper electrode means comprise two upper electrodes 24 and 25. For clarity certain parts associated with these electrodes are omitted from FIGURE 2, namely thrust means for controlling the position of the electrode body and an associated sleeve-like member, in each case such thrust means however being shown in FIGURE 4.

Apart from the length of the electrode body these are of identical construction and hence only one of them as shown in FIGURE 4, assumed to be the electrode 24, will be described.

This electrode comprises an electrode body in the form of a stem constituted conveniently by a rod 26 of molybdenum having an outer end portion 27 lying within an aperture extending through the furnace wall and projecting to the exterior thereof, and having an inner portion 29 lying within the feeding chamber 10.

Where the electrodes extend through the furnace wall the latter is thickened externally by a supplementary wall component 13a. The side wall generally of the feeding chamber is surrounded by a member 38 of the plate-like form secured to the refractory side wall and having an aperture 38a through which the outer end portions of the electrodes 24 and 25 are accessible.

The outer end portion 27 is embraced by a tightly fitting sleeve-like member 30 of copper which is itself a tight fit in the opening 28 and serves to prevent the outflow of glass through the interspace between the rod and the opening. At its outer end the sleeve-like member 30 incorporates radially extending gills or fins 31 disposed in a recess or chamber 32 formed in the side wall 13. In certain cases the heat dissipating area afforded by the gills or fins 31 is sufficient to provide heat exchange with the ambient atmosphere at a rate which maintains the temperature of the outer end portion 27 of the molybdenum and below the temperature at which destructive oxidation thereof will take place. However, if desired, auxiliary heat exchange means, such as a fan or impellor, and a duct structure may be provided in association with the gills or fins 31 to direct a current of cooling air on to these and so maintain the associated outer end portion 27 at a sufficiently low temperature to avoid destructive oxidation.

At its outer end the sleeve-like member 31 is equipped with two gland members 33 and 34 between which is defined an annular space containing sealing material 35 such as asbestos, the gland members being movable relatively to the sleeve-like body 31 and to each other in an axial direction to effect compression of the material 35 by the provision of either screw threads thereon or compression bolts extending through the flanges of these members.

Externally the electrode as a whole including the sleeve-like member 30 is secured against outward axial movement relatively to the opening 28 by a thrust structure comprising a plate 36 secured by bolts 37 to the fixed mounting member 38 at the outer side of the lateral wall 13.

Threaded thrust rods 39 extending through clearance holes in the plates 36 are equipped with nuts 40 on opposite sides of each plate enabling the thrust rods to be adjusted axially and bear at their inner ends through the intermediary of pads 41 and a ring member 42 against the flange 43 of the sleeve-like member 31 to retain this in assembled relation with the lateral wall of the furnace.

At their outer ends the thrust rods 39 carry a pusher plate 43 having clearance holes through which the outer ends of the thrust rod pass. Nuts 44 enable the pusher plate to exert axial pressure against the outer end of the rod 26 through the intermediary of a thrust pad 45.

It will be evident that the rod 26 can be adjusted axially relatively to the sleeve-like member 31 upon relaxation of one or both land members 33 and 34 and the latter can then be re-tightened.

The pads 41 and 45 may be made of a non-metallic material which is a poor conductor of heat, for example a composite material including asbestos and a suitable binder. This serves to maintain the screwed rods 39, nuts 40 and 44 and pusher plate 43 at a temperature at which these parts themselves do not deteriorate through oxidation and at which the nuts can be operated by spanners or the like without danger or inconvenience to the operator when it is desired to adjust the position of the electrode rod axially relatively to the sleeve-like member 31.

It will be further evident that if it is desired to remove the electrode rod 26 for replacement the pusher plate 43 which constitutes in combination with the pad 45, the thrust member associated with this rod can be removed entirely to permit the rod to be withdrawn and a fresh rod inserted leaving the ring member 42, pads 41, and screw-threaded rods 39 in position.

Such exposed end portion carries a clamp 46 forming a terminal for an electrical cable.

The electrodes 24 and 25 are connected to a supply circuit such as that disclosed in the aforesaid United States Patent 3,080,737 and in particular FIGURE 6 thereof. Such supply circuit includes means enabling the voltage difference between the lower electrode 16 and one of the electrodes 24 to be adjusted relatively to that between the lower electrode 16 and the upper electrode 25.

During operation of the furnace assembly the level of glass in the feeding chamber is maintained at least at the position indicated by the line 57 which typically is 1 to 2 inches above the uppermost parts of the rods of the electrodes 24 and 25. The inner portions of these are therefore constantly immersed in the glass and are not exposed to destructive oxidation, whilst their outer end portions are maintained at a temperature below that at which destructive oxidation takes place by virtue of the heat extraction effected by means of the sleeve-like member 30.

It will be evident that one of these electrodes 24 is situated at a position between the outlet 12 and the lateral entry 58 to the feeding chamber, while the other electrode 25 is situated between the outlet and that portion of the side wall 13 of the feeding chamber remote from the entry 58.

In operation the sleeve 23 is raised out of contact with the bush 15 and consequently an electrical current path exists through the glass contained in the feeding chamber from the lower electrode 16 to each of the upper electrodes. The supply circuit enables the current density in one of these paths to be varied relatively to that existing in the other of these paths, as described and claimed in the aforesaid United States Patent 3,080,737 in order to ensure symmetrical heating of the body of glass emergent from the outlet 12 when the plunger 51 is operated.

Variation of current density in these two paths provides for control of temperature gradient existing in the glass gob or stream delivered from the outlet along a direction represented by the longitudinal axis 47.

In cases where it is desired to obtain similar adjustment of the temperature gradient in a direction along the transverse axis 48 a different arrangement of upper electrodes could be adopted. For example four such electrodes as have already been described and illustrated may be provided, these being situated in the four quadrants defined by the axes 47 and 48 and the inner surface of the lateral wall 13 of the furnace chamber, and these four electrodes may be connected to a supply circuit providing for adjustment of the individual voltage on each of these electrodes relatively to that of the lower electrode 16.

Whatever arrangement is adopted the parts forming the electrode bodies are situated as near as possible to the normal surface level of the molten glass to ensure that despite normal operational variations in this level, each electrode is continuously immersed and is hence protected from destructive oxidation.

The space in the chamber above the surface of the glass can be filled, if desired, with a gaseous constituent which is selected to maintain the composition of the glass free from random or uncontrolled variations.

What we claim then is:

1. In a glass feeding furnace comprising a feeding chamber having a side wall formed with a lateral entry for inflow of glass into said chamber to maintain the surface of such glass in said chamber above a minimum level and a bottom wall having an outlet for downward delivery of a body of glass from said chamber, the improvement comprising:
   (A) lower electrode means disposed in the vicinity of said outlet and extending around a reference axis passing upwardly through said outlet,
   (B) upper electrode means including a plurality of electrodes disposed in positions spaced apart angularly about said reference axis and spaced axially thereof from said lower electrode means each of said electrodes including a portion disposed in said chamber below said minimum level and a portion extending through one of said chamber walls,
   (C) a source of electrical current,
   (D) circuit means connecting said source to said upper electrodes and said lower electrode means to pass current through the glass contained in said chamber in a plurality of path extending from said lower electrode means to said upper electrodes respectively, and
   (E) means for varying the current density in one of said paths relatively to that in another of said paths.

2. The improvement claimed in claim 1 wherein:
   (A) each of said upper electrodes comprises an electrode body in the form of a stem having a portion disposed in said feeding chamber and a portion extending through the side wall thereof,
   (B) a sleeve-like member embracing the last said portion of said stem, said sleeve-like member presenting a heat dissipating surface externally of said feeding chamber, and
   (C) means for controlling the relative positions of said stem and said sleeve in a direction longitudinally of said stem and operable externally of said chamber.

3. The improvement claimed in claim 2 wherein:
   (A) one of said upper electrodes has said portion thereof which is disposed within said feeding chamber situated between said entry and said outlet as viewed in plan,
   (B) another one of said upper electrodes has said portion thereof disposed within said feeding chamber situated between said outlet and that portion of said side wall of said feeding chamber remote from said entry.

4. The improvement claimed in claim 2 wherein:
   (A) each of said electrode stems is made of molybdenum,
   (B) said sleeve-like member has a heat dissipating surface of sufficient area to maintain said outer portion of said stem at an operating temperature below that at which destructive oxidation takes place.

5. The improvement claimed in claim 2 wherein:
   (A) said means for controlling the relative positions of said stem and said sleeve comprise a thrust member engaging with said sleeve to transmit movement thereto axially of said stem,
   (B) a further thrust member engaging with said stem to transmit axial movement thereto, and
   (C) screw means determining the axial positions of said thrust members.

6. The improvement claimed in claim 5 wherein:
   (A) the first said thrust member has an aperture through which the sleeve-like member extends and the thrust member engages the sleeve-like member through the intermediary of a flange means extending radially at the boundary of said aperture on one at least of these members,
   (B) the second said thrust member is disposed at the outer end of the stem and projects laterally therefrom, and
   (C) said screw means comprises a plurality of screw threaded rod elements spaced apart angularly about the axis of the stem engaging at their outer ends with the second said thrust member for co-operating through nut means with an apertured mounting member fixed relatively to said feeding chamber.

7. The improvement claimed in claim 6 wherein the second said thrust member is releasably engaged with the outer ends of said screw threaded rods by further nut means provided thereon to enable it to be removed from axial alignment with said stem and to enable said stem to be withdrawn from and inserted in said feeding chamber without dis-assembly therefrom of said sleeve-like member.

References Cited

UNITED STATES PATENTS

| | | | |
|---|---|---|---|
| 2,276,295 | 3/1942 | Ferguson | 13—6 |
| 2,790,019 | 4/1957 | Stalego | 13—33 |
| 2,830,107 | 4/1958 | Hahn et al. | 13—6 |
| 3,080,737 | 3/1963 | Gell et al. | 13—6 X |

BERNARD A. GILHEANY, *Primary Examiner.*

H. B. GILSON, *Assistant Examiner.*